June 11, 1929.　　A. W. SCHORGER　　1,717,172

SEALING COMPOUND

Filed Oct. 1, 1927

INVENTOR
Arlie W. Schorger
BY
Pennie, Davis, Marvin & Edmonds
ATTORNEYS

Patented June 11, 1929.

1,717,172

UNITED STATES PATENT OFFICE.

ARLIE W. SCHORGER, OF MADISON, WISCONSIN, ASSIGNOR, BY MESNE ASSIGNMENTS, TO BURGESS BATTERY CO., OF MADISON, WISCONSIN, A CORPORATION OF WISCONSIN.

SEALING COMPOUND.

Application filed October 1, 1927. Serial No. 223,332.

My invention relates to the composition of a sealing compound having an asphalt base and especially suitable for certain types of dry cells.

It is an object of my invention to compound a fusible sealing material having an asphaltic base which has a relatively high melting point but which is rubbery and elastic at room temperatures and sticks tenaciously to the materials which are to be sealed.

In the accompanying drawings I have shown the sealing compound used in connection with a battery of the flat type. In this showing, Fig. 1 is a perspective view of a flat cell;

Figure 1:
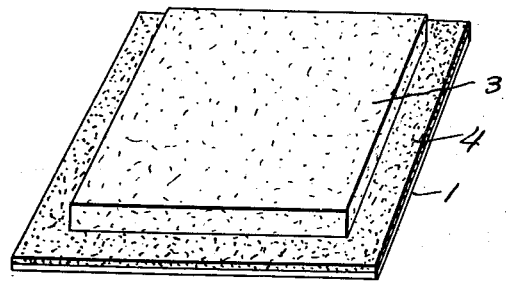
Figure 2:
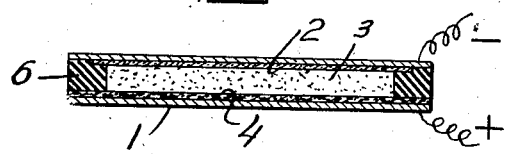
Fig. 2 is a cross sectional view of a cell.
Figure 3:
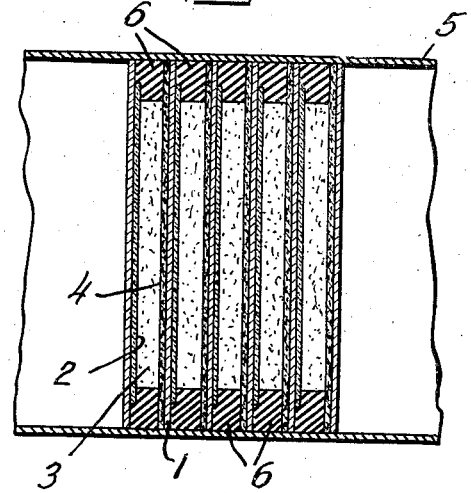
Fig. 3 is a cross sectional view of a plurality of cells assembled in a container to form a battery.

In the dry cell industry and especially in the manufacture of dry batteries composed of flat cells, it is necessary to use a sealing material having peculiar properties to secure the best results with the batteries. A dry battery of flat cells is made up of successive layers of sheet zinc 1, bibulous liners 2, flat depolarizing mix cakes 3, and flat carbons 4, held under pressure by tape or other suitable binding material. This battery of cells usually is then sealed by enclosing it in a paper box 5 and pouring a fusible seal 6 over it to completely encase it. The fusible seal contacts with the edge portions of the carbon and zinc electrodes and with the retaining box. When the battery is in operation and often during temperature changes, there is a tendency for a breathing action similar to that of a bellows. This action is probably due to the generation or expansion of gases in the depolarizing mixture resulting from the reactions occurring therein and also because of temperature changes under such conditions a hard fusible seal of no elasticity will crack and break whereas a rubbery compound deforms without cracking. The compound must not permanently deform under these conditions but should be elastic so that it regains its shape after the pressure is relieved by leakage. The compound must also have a comparatively high melting point (about 100° C.) so that the seal does not flow if the battery is used or is stored or shipped in a hot location as in a freight car on a hot day in summer. Furthermore the compound must be tacky enough to cause it to adhere tightly to the projecting portions of the zinc and carbon electrodes and to the container.

I have discovered that if Montan wax is added in limited amount to an asphaltic material, the resulting mixture has the desirable properties enumerated above. Linseed oil is usually added to the mixture. It has been usual to add paraffin to asphalt to soften it for the above purpose but paraffin and asphalt are not entirely miscible and a homogeneous mixture is not obtained. The mixture has a "short" consistency. On the other hand, Montan wax, which is a true wax extracted from German brown coal, is entirely soluble in asphalt and gives it a tough rubbery consistency at ordinary temperatures.

If an asphalt with a softening point of about 117° C. is used, 80 parts of this asphalt is blended with 10 parts of Montan wax and 10 parts of linseed oil to form a rubbery compound having a melting point of about 94° C. By decreasing the Montan wax or linseed oil content, the softening point is raised.

If it is desirable (as for high summer temperatures) to have a compound having a melting point of about 110° C., 82.5 parts of the 117° C. asphalt is blended with 15.5 parts of Montan wax and 2.00 parts of linseed oil. The linseed oil may be omitted entirely. The proportions given are illustrative and may be varied to suit any special requirement. With an asphalt melting at 117° C. it is desirable to have at least 75 percent of that compound present.

The composition may be employed for other purposes in which a material having such properties is desirable, and the disclosure of its use in connection with a flat cell is merely illustrative.

I claim:

1. An elastic sealing compound for use in dry batteries consisting essentially of an asphaltic material and Montan wax.

2. An elastic sealing compound for use in dry batteries consisting essentially of asphalt, Montan wax and linseed oil.

3. An elastic sealing compound for use in dry batteries consisting essentially of at least 75 percent of an asphalt melting at about 117° C., the balance consisting of Montan wax and linseed oil.

4. An elastic sealing compound for use in dry batteries consisting essentially of 80 to 82.5 parts of asphalt melting at about 117° C., 10 to 15.5 parts of Montan wax and 2 to 10 parts linseed oil.

In testimony whereof I affix my signature.

ARLIE W. SCHORGER.